United States Patent Office 2,929,834
Patented Mar. 22, 1960

2,929,834

THIOPHOSPHORIC ACID ESTERS AND THEIR PRODUCTION

Gerhard Schrader, Wuppertal-Cronenberg, Germany, assignor to Farbenfabriken Bayer Aktiengesellschaft, Leverkusen, Germany, a corporation of Germany No Drawing. Original application September 5, 1956, Serial No. 607,989. Divided and this application July 16, 1958, Serial No. 748,821

Claims priority, application Germany September 7, 1955

1 Claim. (Cl. 260—461)

This invention relates to, and has as its objects new and useful thiophosphoric acid esters and their preparation. Generally these new esters correspond to the formula

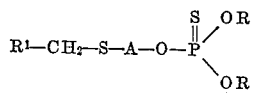

In this formula R stands for an alkyl (especially lower alkyl) or aryl (especially phenyl) radical, A is a lower alkylene radical, especially an ethylene chain and $R^1$ stands for a carboxylic acid ester radical, an aminoalkyl radical, a free or esterified hydroxyalkyl-mercaptoradical or an alkylmercapto, arylmercapto, alkoxy- or aryloxy radical. The present application is a division of copending patent application Serial No. 607,989, filed September 5, 1956, and entitled "Thiophosphoric Acid Esters and Their Production."

Many thiophosphoric acid esters have become very important pesticides or plant protecting agents recently. It has now been found that effective compounds of this class of phosphor insecticides may be obtained by reacting O.O-diesters of thiophosphoric acid halides with alcohols of the general formula $$R^1\text{—}CH_2\text{—}S\text{—}A\text{—}OH$$

in which A and $R^1$ stand for the above mentioned radicals. Typically this reaction may be shown by the following equation:

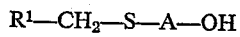
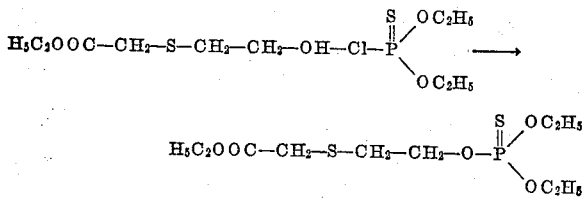

Instead of the diethylester of thiophosphoric acid chloride also other esters such as the dimethyl, dipropyl, dibutyl, diphenyl, dicyclohexyl, etc., ester may be used. Mixed esters of these types may also be used. Instead of the acid-chloride also other acid halides such as the bromide are convenient.

As to the second reactant in this equation which corresponds to the formula $$R^1\text{—}CH_2\text{—}S\text{—}A\text{—}OH$$

and for which in the above typical equation the radical $R^1$ is shown as a carboxylic ester radical, also various other compounds may be used. Thus, the radical $R^1$ may be any other carboxylic acid ester such as the other lower alkyl (e.g. methyl-, propyl-, butyl-, amyl-) phenyl- or cycloalkyl (e.g. cyclohexyl or cyclopentyl) esters. $R^1$ further may be an alkyl amino radical of the formula

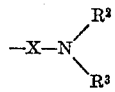

wherein —X— is a lower alkylene-, such as a methylene-, ethylene-, propylene-, butylene-, etc. and $R^2$ and $R^3$ stand for lower alkyl radicals such as methyl-, ethyl-, propyl-, butyl-, etc. radicals, or

may form a ring such as piperidine, piperazine, morpholine or the like. $R^1$ also may be the residue of a hydroxyalkyl mercaptan or its esters of the formula —S—Y—$OR^4$, wherein Y stands for lower alkylene and $R^4$ stands for hydrogen or the radical of an organic or inorganic acid, thus forming an ester of the hydroxyalkyl mercaptan. At last $R^1$ may also be represented by the formula —S—$CH_2$—Z—$R^5$, wherein $R^5$ stands for alkyl or aryl radicals such as the methyl-, ethyl-, propyl-, butyl-, amyl-, hexyl-, phenyl- group, etc. and Z stands for oxygen or sulfur.

The alcohols can be prepared by processes known by the art, for example by reacting a hydroxy alkyl mercaptan with a compound of the formula $R^1$—$CH_2$-hal, wherein $R^1$ has the above defined meaning and wherein hal stands for a halogen like chlorine, at slightly elevated temperature and preferably in the presence of an acid-binding agent and an inert diluent.

The reaction shown in the above Equation I, generally is carried out by heating the alcoholates such as the sodium or potassium alcoholates of the above alcohols with the thiophosphoric acid halides or by mixing the free alcohols and acid halides and splitting off hydrohalogen acid by acid-binding agents such as sodium methylate, sodium ethylate, sodium carbonate, potassium carbonate, pyridine, quinoline, etc. Sometimes the use of metallic catalysts such as copper powder may be advantageous. The reaction furthermore should preferably by carried out in inert solvents such as liquid alcohols, ketones, hydrocarbons, etc.; especially suitable are e.g. methanol, ethanol, methyl-ethyl-ketone, benzene, toluene, xylene, etc. The reaction temperature may vary within wide limits. Temperatures from 0° to about 250° C. may be used, especially suitable are temperatures from about 30° to about 100° C.

The compounds of the present invention are generally valuable insecticides and plant-protecting agents. They kill pests such as aphids, flies and mites and exhibit a very remarkable systemic action. The application of these compounds should be carried out according to the use of other known phosphor insecticides, i.e. in dilution or solution with solid or liquid carriers such as chalk, talc, bentonite, water, alcohols, liquid hydrocarbons, etc. The invention compounds may further be used in combination with other known insecticides or pesticides, etc. Effective concentrations of the compounds may vary also; generally concentrations of 0.0001% to 1.0% kill pests effectively. The combination of the compounds may be sprayed or dusted or otherwise brought in contact with pests or plants to be protected. They may also be used as aerosols.

The following examples are given by way of illustration only without limiting the present invention thereto.

*Example 1*

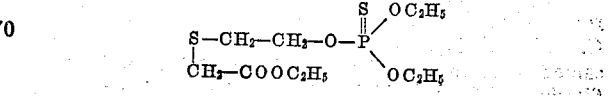

50 grams of ethyl-(β-hydroxyethyl-thio-glycolate) are dissolved in 200 cc. of toluene. 45 grams of potassium carbonate and 1 gram of copper powder are added. At 85–90° C. there are added dropwise 60 grams of O,O-diethyl-thio-phosphoric acid chloride. The mixture is then kept at 90° C. for further three hours. After cooling and filtering off from precipitated salts the solvent is distilled off. There are obtained 60 grams of the new ester boiling at 170° C. at 2 mm. Hg.

This ester kills flies in a concentration of 0.01% completely and furthermore exhibits systemic action.

The ethyl-(β-hydroxyethyl-thio-glycolate) can be obtained as follows:

40 grams of the hydroxy-ethyl mercaptan are dissolved in 300 cc. of methyl-ethylketone. Upon adding 75 grams of finely divided potassium carbonate, 62 grams of chloroacetic acid ethyl ester are added dropwise at 40° C. The reaction mixture is kept for one hour at the same temperature. After cooling and filtering off from precipitated salts the reaction mixture is fractionated. There are obtained 57 grams of ethyl-(β-hydroxyethyl-thio-glycolate) boiling at 108° C. at 2 mm. Hg.

*Example 2*

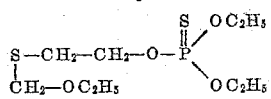

65 grams of (β-hydroxyethyl-)-(ethoxymethyl-) mercaptan are dissolved in 300 cc. of toluene. 75 grams of potassium carbonate and 3 grams of finely divided copper are added. While stirring there are added dropwise 95 grams of O,O-diethyl-thiophosphoric acid chloride at 80–90° C. This temperature is maintained for about further 4 hours. The following procedure is carried out according to the description of Example 1. There are obtained 40 grams of the new ester of the above formula, boiling at 2 mm. Hg at 138° C. This ester kills aphids within a concentration of 0.01% completely and shows systemic properties.

The (β-hydroxyethyl)-(ethoxymethyl-) mercaptan can be obtained as follows:

40 grams of hydroxyethyl-mercaptan are dissolved in 300 cc. of methyl-ethylketone. Upon adding 75 grams of finely divided potassium carbonate while stirring, 50 grams of α-chloromethylethyl ether are added dropwise at a temperature of 40° C. The reaction mixture is kept at the same temperature for about one hour. After cooling and filtering off from precipitated salts, the reaction mixture is fractionated. There are obtained 35 grams of (β-hydroxyethyl-)-(ethoxymethyl-) mercaptan boiling at 71° C. at 2 mm. Hg.

*Example 3*

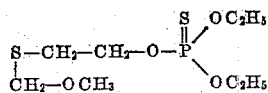

61 grams of (β-hydroxyethyl-)-(methoxymethyl-) mercaptan are dissolved in 250 cc. of toluene and there are added 75 grams of potassium carbonate and 2 grams of copper powder. 95 grams of O,O-diethyl-thiophosphoric acid chloride are then added dropwise at 85° C. This temperature has to be maintained for further 3 hours. The following procedure is to be seen from Example 1. There are obtained 41 grams of the above ester boiling at 2 mm. Hg at 132° C.

The (β-hydroxyethyl-)-(methoxymethyl-) mercaptan is obtained as follows:

40 grams of hydroxyethyl-mercaptan are dissolved in 300 cc. of methyl-ethylketone. Upon adding 75 grams of finely divided potassium carbonate, 42 grams of β-chloromethyl-methyl ether are added at a temperature of 40° C. while stirring. The reaction mixture is kept at the same temperature for about one hour. After cooling and filtering off from precipitated salts, the reaction mixture is fractionated. There are obtained 32 grams of (β-hydroxyethyl-)-(methoxymethyl-) mercaptan boiling at 62° C. at 2 mm. Hg.

*Example 4*

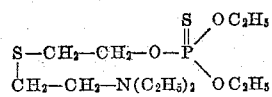

54 grams of (β-hydroxyethyl-) (β-[diethylamino-]ethyl-) mercaptan are dissolved in 200 cc. of toluene. 45 grams of potassium carbonate and 2 grams of finely divided copper are added. At a temperature of about 80° C. there are added dropwise 58.5 grams of O,O-diethyl-thiophosphoric acid chloride and this temperature is kept for about two more hours. The following procedure is to be seen from Example 1. There are obtained 50 grams of the new ester as a colorless and water insoluble oil which distils under decomposition even in high-vacuum distillation.

The (β-hydroxyethyl-)-(β-[diethylamino-]ethyl-) mercaptan is obtained as follows:

40 grams of hydroxethyl mercaptan are dissolved in 300 cc. of methyl-ethylketone. Upon adding 75 grams of finely divided potassium carbonate, 68 grams of 2-diethylamino-2-chloroethane are added dropwise at a temperature of 40° C. The reaction mixture is kept for one hour at the same temperature. After cooling and filtering off from precipitated salts the reaction mixture is fractionated. There are obtained 74 grams of (β-hydroxyethyl-) - (β - [diethylamino-]ethyl) mercaptan boiling at 104° C. at 2 mm. Hg.

*Example 5*

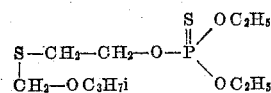

23 grams of (β-hydroxyethyl-)-(isopropylhydroxymethyl-) mercaptan are mixed with 15 grams of pyridine. At 40° C. there are added 29 grams of O,O-diethyl thiophosphoric acid chloride. The mixture has to be cooled so that the reaction temperature does not rise over 40° C. After stirring the mixture for one further hour, it is poured in ice water (300 cc.) containing 20 ml. of concentrated hydrochloric acid. The precipitated oil is taken up in 200 cc. of chloroform. The chloroform solution is washed twice with 20 cc. of water and then dried over sodium sulfate. After distilling off the solvent there are obtained 43 grams of new ester, distilling at 0.01 mm. Hg at 115° C.

The (β - hydroxyethyl-) - (isopropylhydroxymethyl-) mercaptan is obtained as follows:

40 grams of hydroxyethyl mercaptan are dissolved in 300 cc. of methyl-ethylketone. Upon adding 75 grams of finely divided potassium carbonate, 55 grams of α-chloromethyl-isopropyl ether are added dropwise at a temperature of 40° C. The same temperature is kept for another hour. After cooling and filtering off from precipitated salts the reaction mixture is fractionated. There are obtained 35 grams of (β-hydroxyethyl-)-(isopropylhydroxymethyl-) mercaptan boiling at 89° C. at 2 mm. Hg.

*Example 6*

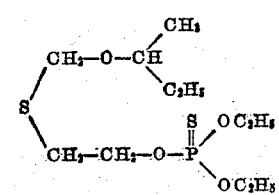

53 grams of (β-hydroxyethyl-)-(sec.-butyl-hydroxymethyl-) mercaptan are dissolved in 35 grams of pyridine. 51 grams of O,O-diethyl-thiophosphoric acid chloride are added at 40° C. not allowing the temperature to rise above this point. The mixture is poured in 200 cc. of water containing 20 cc. of hydrochloric acid (conc.). The further recovering of the new ester is carried out in accordance with the description in Example 5. There are obtained 70 grams boiling at 0.01 mm. Hg at 120° C. This ester kills aphids in a concentration of 0.01% completely and has systematic properties.

The ($\beta$-hydroxyethyl-)-(sec.-butyl-hydroxymethyl-) mercaptan is obtained as follows:

40 grams of hydroxyethyl mercaptan are dissolved in 300 cc. of methyl-ethylketone. Upon adding 75 grams of finely divided potassium carbonate, 62 grams of $\alpha$-chloromethyl-sec.-butyl ether are added dropwise at 40° C. The reaction mixture is thereafter kept for another 15 minutes at the same temperature. After cooling and filtering off from precipitated salts the reaction mixture is fractionated. There are obtained 53 grams of ($\beta$-hydroxyethyl-)-(sec.-butyl hydroxy-methyl-) mercaptan boiling at 58° C. at 0.01 mm. Hg.

*Example 7*

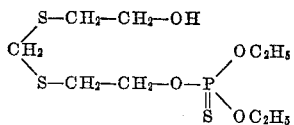

43 grams of di-($\beta$-hydroxyethyl-) mercaptan are dissolved in 125 cc. of methyl-ethylketone. 2 grams copper powder and 27 grams potassium carbonate are added. At 78° C. 47.5 grams O,O-diethyl-thiophosphoric acid chloride are dropped in. The reaction mixture is kept at 80° C. for further 6 hours then cooled at room temperature and filtered with suction and the solvent is distilled off. There are obtained 42 grams of a yellow and water-unsoluble oil which could not be distilled even in the high vacuum. This compound exhibits insecticidal action against moths and white ants.

The di-($\beta$-hydroxyethyl-) mercaptan can be obtained as follows:

20 grams of hydroxymethyl mercaptan are dissolved in 50 cc. of methanol. Upon adding an alcoholic sodium methylate solution containing $2/10$ mol of sodium methylate, 20 grams of methylene bromide are added at 40° C. while stirring. The reaction mixture is kept at the same temperature for about 6 hours. After cooling and filtering off from precipitated salts, the reaction mixture is fractionated. There are obtained 35 grams of the di-($\beta$-hydroxyethyl-) mercaptan boiling at 145° C. at 0.22 mm. Hg.

*Example 8*

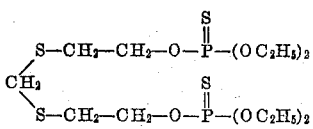

34 grams of di-($\beta$-hydroxyethyl-)-mercaptan are dissolved in 125 cc. of methyl-ethylketone. 60 grams of potassium carbonate and 2 grams of copper powder are added. At 80° C. 77 grams O,O-diethyl-thiophosphoric acid chloride are added and the temperature of 80° C. is kept for further 5 hours. The following procedure is carried out in accordance with Example 7. There are obtained 60 grams of the crude ester which cannot be distilled in high vacuum.

I claim:
The thiophosphoric acid ester of the following formula

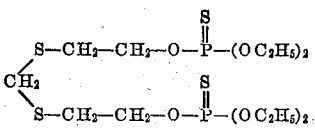

References Cited in the file of this patent
FOREIGN PATENTS
1,014,988    Germany _____ Sept. 5, 1957